US012395774B2

(12) United States Patent
Kwak et al.

(10) Patent No.: US 12,395,774 B2
(45) Date of Patent: Aug. 19, 2025

(54) EAR TIP, ELECTRONIC DEVICE COMPRISING EAR TIP, AND METHOD FOR MANUFACTURING EAR TIP

(71) Applicant: Samsung Electronics Co., Ltd., Suwon-si (KR)

(72) Inventors: Jinyoung Kwak, Suwon-si (KR); Yoonseok Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 257 days.

(21) Appl. No.: 18/335,740

(22) Filed: Jun. 15, 2023

(65) Prior Publication Data

US 2023/0328421 A1 Oct. 12, 2023

Related U.S. Application Data

(63) Continuation of application No. PCT/KR2022/000015, filed on Jan. 3, 2022.

(30) Foreign Application Priority Data

Jan. 13, 2021 (KR) ........................ 10-2021-0004833

(51) Int. Cl.
*H04R 1/10* (2006.01)

(52) U.S. Cl.
CPC ......... *H04R 1/1016* (2013.01); *H04R 1/1075* (2013.01)

(58) Field of Classification Search
CPC ...... H04R 1/10; H04R 1/1016; H04R 25/652; H04R 25/656; H04R 2225/025; H04R 2225/77
See application file for complete search history.

(56) References Cited

U.S. PATENT DOCUMENTS 6,148,821 A * 11/2000 Falco .................. H04R 1/1016 128/867
8,348,011 B1 * 1/2013 Huang ................ H04R 25/656 381/328

(Continued)

FOREIGN PATENT DOCUMENTS

JP 2008277909 A 11/2008
JP 2010010885 A 1/2010

(Continued)

OTHER PUBLICATIONS

International Search Report for PCT/KR2022/000015 mailed Apr. 19, 2022, 5 pages.

(Continued)

*Primary Examiner* — Ryan Robinson
(74) *Attorney, Agent, or Firm* — Nixon & Vanderhye, P.C.

(57) ABSTRACT

An example ear tip includes a first member including a first inner space; a shield member which includes a first surface and a second surface and is arranged in the first inner space; and a second member which includes a second inner space that is connected to the first inner space via the shield member and is coupled to the first member so as to at least partially surround the first member, wherein the first member including a first fixing unit which is coupled to a first region of the first surface and a second fixing unit which is coupled to a region of the second surface, the region partially overlapping the first region.

20 Claims, 9 Drawing Sheets

(56) References Cited

U.S. PATENT DOCUMENTS

| | | | | |
|---|---|---|---|---|
| 8,406,448 | B2 * | 3/2013 | Lin | H04R 1/1091 381/370 |
| 10,237,640 | B2 * | 3/2019 | Siahaan | B29C 43/183 |
| 11,072,101 | B2 * | 7/2021 | Huang | B29C 45/14 |
| 11,159,899 | B2 * | 10/2021 | Jeong | H04R 25/654 |
| 11,240,582 | B1 * | 2/2022 | Lee | H04R 25/652 |
| 11,805,351 | B2 * | 10/2023 | Huang | H04R 1/1016 |
| 2011/0158457 | A1 | 6/2011 | Ishizaka | |
| 2015/0049897 | A1 * | 2/2015 | Blanchard | H04R 25/656 381/380 |
| 2016/0302000 | A1 | 10/2016 | Shin | |
| 2018/0000649 | A1 | 1/2018 | Wang | |
| 2019/0208303 | A1 | 7/2019 | Monti et al. | |
| 2020/0107099 | A1 | 4/2020 | Mcintosh et al. | |
| 2020/0128340 | A1 | 4/2020 | Jeong et al. | |
| 2020/0221205 | A1 | 7/2020 | Park et al. | |
| 2020/0221206 | A1 * | 7/2020 | Iseberg | H04R 1/1016 |
| 2021/0243514 | A1 * | 8/2021 | Hatfield | H04R 1/1016 |

FOREIGN PATENT DOCUMENTS

| | | | |
|---|---|---|---|
| JP | 2010226300 | A | 10/2010 |
| JP | 2011151793 | A | 8/2011 |
| JP | 2013074592 | A | 4/2013 |
| JP | 2013229728 | | 11/2013 |
| KR | 101653331 | B1 | 9/2016 |
| KR | 101693268 | B1 | 1/2017 |
| KR | 102065551 | B1 | 1/2020 |
| KR | 20200045281 | A | 5/2020 |
| KR | 20200085007 | A | 7/2020 |
| KR | 20220012554 | A | 2/2022 |

OTHER PUBLICATIONS

Written Opinion of the ISA for PCT/KR2022/000015 mailed Apr. 19, 2022, 4 pages.

Office Action dated Feb. 14, 2025 in Korean Patent Application No. 10-2021-0004833 and English-language translation.

* cited by examiner

EAR TIP, ELECTRONIC DEVICE COMPRISING EAR TIP, AND METHOD FOR MANUFACTURING EAR TIP

CROSS-REFERENCE TO RELATED APPLICATIONS

This application is a continuation of International Application No. PCT/KR2022/000015, designating the United States, filed on Jan. 3, 2022, in the Korean Intellectual Property Receiving Office and claiming priority to Korean Patent Application No. 10-2021-0004833, filed Jan. 13, 2021, in the Korean Intellectual Property Office. The disclosures of each of these applications are incorporated by reference herein in their entireties.

BACKGROUND

Field

The disclosure relates to an ear tip configured to block (or reduce) foreign substances flowing into a wearable sound output device, an electronic device including the ear tip, and a method for manufacturing the ear tip.

Description of Related Art

As the use of portable electronic devices such as smartphones to output content increases, the use of wearable sound output devices that output audio data related to the content is also increasing. A wearable sound output device may transmit vibrations to a user's eardrum using a speaker that converts electrical signals generated by a sound device or an electronic device into sound signals. For example, when the wearable sound output device is worn on a user's outer ear via an ear tip, vibrations may be transmitted to the user's eardrum.

The ear tip coupled to the wearable sound output device may include a shield member (e.g., a shield) configured to block foreign substances (e.g., earwax) that may flow into the wearable sound output device. For example, in the ear tip, the shield member may be disposed between a first member coupled to the wearable sound output device and a second member worn on the outer ear of the user.

SUMMARY

In an ear tip in which the shield member is disposed between the first member and the second member, the shield member may be deformed (e.g., damaged or distorted) in various usage environments (e.g., detachment or washing) due to different materials of the first member and the second member. The deformation of the shield member may cause a problem in that a function of blocking foreign substances is lost and foreign substances are introduced into the wearable sound output device.

Various embodiments disclosed herein provide an ear tip configured to maintain a function of blocking foreign substances that may enter the inside of a wearable sound output device, an electronic device including the ear tip, and a method for manufacturing the ear tip.

An electronic device according to an example embodiment of the present disclosure may include a housing, a speaker disposed within the housing, and an ear tip coupled to the housing. The ear tip may include a first member including a first inner space that is opened to a first direction and a second direction opposite to the first direction, a shield member (e.g., a shield) including a first surface that faces the first direction and a second surface that faces the second direction, wherein the shield member is disposed in the first inner space, and a second member including a second inner space connected to the first inner space through the shield member, wherein the second member is coupled to the first member to surround at least a portion of the first member. The first member may include a first fixing portion coupled to a first area of the first surface, and a second fixing portion coupled to an area of the second surface that partially overlaps the first area when viewed from the first direction.

In an example embodiment, an ear tip may include a first member including a first inner space that is opened to a first direction and a second direction opposite to the first direction, a shield member including a first surface that faces the first direction and a second surface that faces the second direction, wherein the shield member is disposed in the first inner space, and a second member including a second inner space connected to the first inner space through the shield member, wherein the second member is coupled to the first member to surround at least a portion of the first member. The first member may include a first fixing portion coupled to a first area of the first surface, and a second fixing portion coupled to an area of the second surface that partially overlaps the first area when viewed from the first direction.

In an example embodiment, a method for manufacturing an ear tip may include preparing a shielding member including a first surface facing a first direction and a second surface facing a second direction opposite the first direction, a process of molding a first member such that the first member includes a first inner space that is opened to the first direction and the second direction and the shield member is disposed in the first inner space, and a process of molding a second member that includes a second inner space connected to the first inner space through the shield member and is coupled to the first member to surround at least a portion of the first member. The first member may include a first fixing portion coupled to a first area of the first surface, and a second fixing portion coupled to an area of the second surface that partially overlaps the first area when viewed from the first direction.

According to various example embodiments disclosed herein, with an ear tip, an electronic device including the ear tip, and a method for manufacturing the ear tip function, it is possible to maintain the function of blocking foreign substances that may flow into the wearable sound output device by minimizing deformation of the shield member.

In addition, according to various example embodiments disclosed herein, with an ear tip, an electronic device including the ear tip, and a manufacturing method of the ear tip, it is possible to discharge foreign substances passing through the shield member to the outside of the wearable sound output device.

Furthermore, according to various example embodiments disclosed herein, with an ear tip, an electronic device including the ear tip, and a method for manufacturing the ear tip, when the electronic device is worn by a user, it is possible to provide a comfortable fit to the user due to the position of the extension of the second member coupled to the wearable sound output device through the first member.

Various other effects directly or indirectly identified through the disclosure may be provided.

BRIEF DESCRIPTION OF THE DRAWINGS

The above and/or other aspects of the disclosure will be more apparent by describing certain embodiments of the disclosure with reference to the accompanying drawings, in which.

In connection with the description of drawings, the same reference numerals may be assigned to the same or corresponding components.

DETAILED DESCRIPTION

Hereinafter, various embodiments of the disclosure will be described with reference to the accompanying drawings. However, it is to be understood that the description is not intended to limit the disclosure to specific embodiments and includes various modifications, equivalents, and/or alternatives of the embodiments of the disclosure.

Figure 1A:
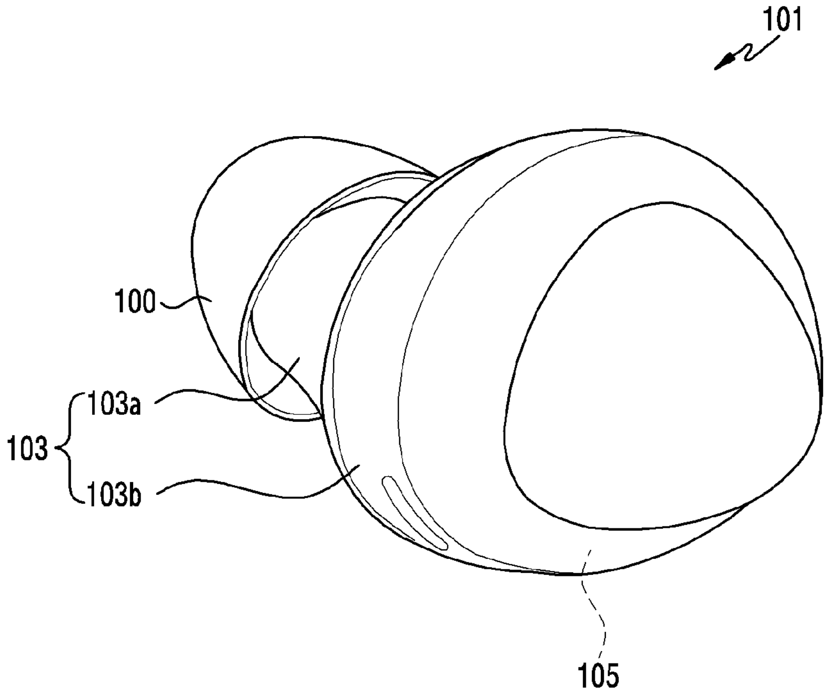
FIG. 1A is a view illustrating an example electronic device coupled with an ear tip according to various embodiments.

FIG. 1A is a view illustrating an example electronic device coupled with an ear tip according to various embodiments.

Referring to FIG. 1A, an electronic device 101 (e.g., a wearable sound output device) according to an embodiment may include a housing 103, a speaker 105, and an ear tip 100.

According to an embodiment, the housing 103 may be configured in a form that is wearable on a user's ear. For example, the housing 103 may include a first portion **103*a* that may be at least partially inserted into the user's outer ear, and a second portion 103*b* that may be seated in a recess of the user's auricle connected to the outer ear. The electronic device 101 may include a speaker 105 (e.g., the sound output module 655 in FIG. 6) disposed inside the housing 103. The sound output from the speaker 105 may be emitted through the first portion 103*a* inserted into the user's outer ear and transmitted to the user's eardrum. At least a portion of the housing 103** may be made of various materials such as polymer or metal.

According to an embodiment, the ear tip 100 may be coupled to the first portion **103*a* of the housing 103. The first portion 103*a* of the housing 103 may be inserted into the inner space (e.g., the first inner space 211 of FIG. 2A) of the ear tip 100. For example, the ear tip 100 may be seated in a recess provided in the first portion 103*a* of the housing 103 and coupled to the first portion 103*a*. When the first portion 103*a* of the housing 103 is inserted into the outer ear of the user, the ear tip 100 may be elastically disposed between the outer ear of the user and the first portion 103*a* of the housing 103. The ear tip 100 may have a size and shape that is couplable to the first portion 103*a* of the housing 103**.

Figure 1B:
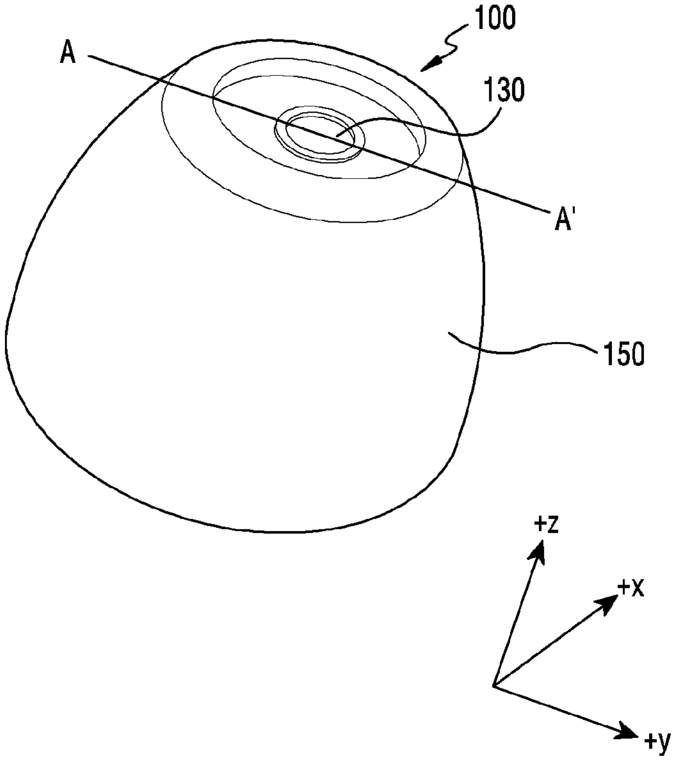
FIG. 1B is a view illustrating an external shape of an example ear tip according to various embodiments.

FIG. 1B is a view illustrating an external shape of an example ear tip according to various embodiments.

Referring to FIG. 1B, the ear tip 100 according to an embodiment may be coupled to a sound output device (e.g., an earphone) and worn on a user's external ear. For example, when the ear tip 100 is coupled to the sound output device via the first member (e.g., the first member 210 of FIG. 2A), the second member 150 may be inserted into the outer ear of the user. The second member 150 may be made of an elastic material to be deformed to suit the outer ear of the user. The ear tip 100 may include a shield member 130 to block foreign substances (e.g., earwax). For example, the ear tip 100 may block earwax flowing into the ear tip 100 from the outer ear of the user using the shield member 130.

Figure 2A:
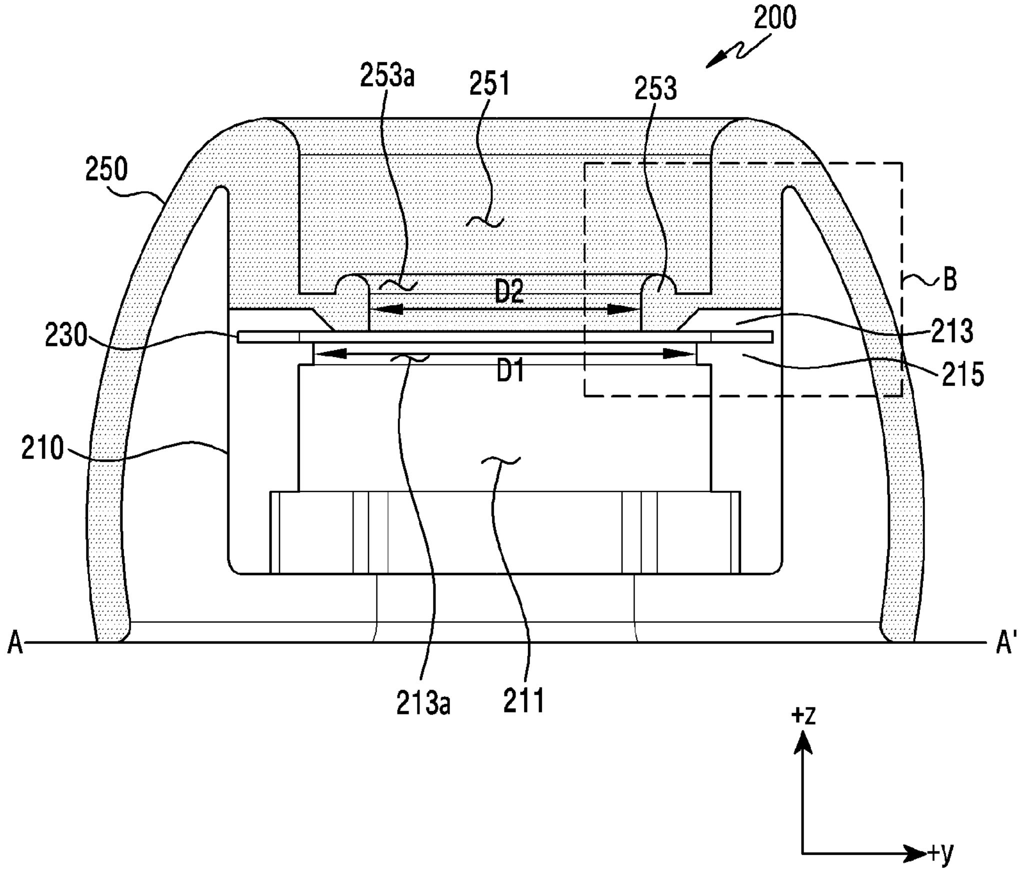
FIG. 2A is a cross-sectional view of the example ear tip according to various embodiments.

FIG. 2A is a cross-sectional view of the example ear tip according to various embodiments. In an embodiment, FIG. 2A may be a cross-sectional view taken along line A-A' of FIG. 1B.

Referring to FIG. 2A, an ear tip 200 (e.g., the ear tip 100 of FIG. 1B) according to an embodiment may include a first member 210, a shield member 230, and a second member 250.

According to an embodiment, the first member 210 may include a first inner space 211 that is opened to a first direction (e.g., the +z-axis direction) and a second direction (e.g., the −z-axis direction). An audio output device may be coupled to the first inner space 211. In an embodiment, the first member 210 may include a first fixing portion 213 and a second fixing portion 215. The shield member 230 may be coupled between the first fixing portion 213 and the second fixing portion 215. For example, the first fixing portion 213 and the second fixing portion 215 may be made of the same material (e.g., silicone or urethane) in the same hardness (e.g., hardness 65) (or in different hardnesses (e.g., hardness 65 and hardness 25)) to fix opposite surfaces (e.g., the surface in the +z-axis direction and the surface in the −z-axis direction) of the shield member 230. In an embodiment, the second fixing portion 215 may include a first opening **213*a* connected to the first inner space 211. The first opening 213*a*** may have a first diameter D1 of a predetermined length (e.g., about 3 mm).

According to an embodiment, the shield member 230 may be disposed in the first inner space 211. For example, the first fixing portion 213 may be coupled to the first surface (e.g., the surface in the +z-axis direction) of the shield member 230, and the second fixing portion 215 may be coupled to the second surface (e.g., the surface in the −z-axis direction) of the shield member 230. In an embodiment, the shield member 230 may be coupled by the first fixing portion 213 and the second fixing portion 215 of the same body to maintain a stable fixing force in the first inner space 211.

According to an embodiment, the second member 250 may include a second inner space 251 that is opened to the first and second directions. The second inner space 251 may be connected to the first inner space 211 via the shield member 230. For example, sound waves of audio data output through an audio output device coupled to the first member 210 may pass through the shield member 230 from the first inner space 211 and may then be transmitted to the user's ear through the second inner space 250. In an embodiment, the second member 250 may be coupled to the first member 210 to surround at least a portion of the first member 210. For example, the second member 250 may constitute substantially the same body with the first member 210 by being coupled to the first fixing portion 213 via the extension 253 provided in the second direction in the second inner space 251. In an embodiment, the extension 253 may include a second opening **253*a* connected to the second inner space 251. The second opening 253*a* may have a second diameter D2 of a predetermined length (e.g., about 2 mm). The second diameter D2 of the second opening 253***a* may be smaller than the first diameter D1 of the first opening 213*a*.

Figure 2B:
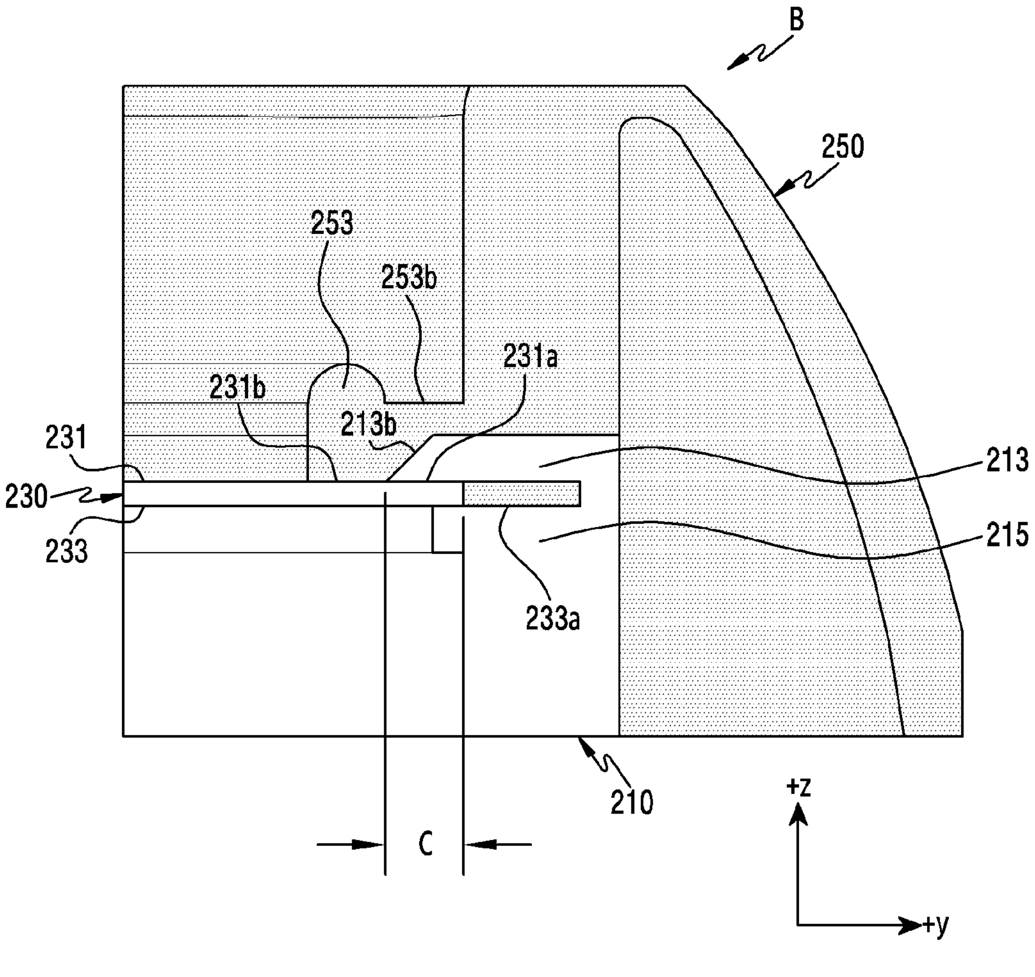
FIG. 2B is an enlarged view of a portion of a cross section of the example ear tip according to various embodiments.

FIG. 2B is an enlarged view of a portion of a cross section of the example ear tip according to various embodiments. In an embodiment, FIG. 2B may be an enlarged view of part "B" of FIG. 2A.

According to an embodiment, the first member 210 may allow the shield member 230 to be disposed between the first fixing portion 213 and the second fixing portion 215. For example, the first fixing portion 213 may be coupled to the first area 231*a* of the first surface 231 of the shield member 230. The second fixing portion 215 may be coupled to an area 233*a* of the second surface 233 of the shield member 230 that partially overlaps the first area 231*a* when viewed from the first direction (e.g., the +z-axis direction). In an embodiment, the first fixing portion 213 may protrude more than the second fixing portion 215 toward the central axis of the first member 210. For example, the first fixing portion 213 may have a misaligned area C that does not to overlap the second fixing portion 215 due to the above-mentioned protruding structure.

According to an embodiment, the shield member 230 may be coupled to the first fixing portion 213 and the second fixing portion 215 to divide the first inner space (e.g., the first inner space 211 of FIG. 2A) of the first member 210 and the second inner space (e.g., the second inner space 251 of FIG. 2A) of the second member 230. In an embodiment, the shield member 230 may minimize foreign substances passing toward the first inner space 211 even when the foreign substances are introduced through the second inner space 251.

According to an embodiment, the second member 250 may include an extension 253 to be coupled with the first member 210. For example, the extension 253 may be provided in the second direction (e.g., the −z-axis direction) in the second inner space 251. In an embodiment, a partial surface of the extension 253 (e.g., a portion of the surface in the −z-axis direction) may be coupled to the first fixing portion 213 with the inclined surface 213*b* of the first fixing portion 213 interposed therebetween. In an embodiment, a partial surface of the extension 253 (e.g., the remaining portion of the surface in the −z-axis direction) may be coupled to a second area 231*b* adjacent to the first area 231*a* of the first surface 231 of the shield member 230. The partial surface of the extension 253 coupled to the second area 231*b* may not overlap the misaligned area C of the first fixing portion 213 when viewed from the first direction. In an embodiment, the extension 253 may reinforce the fixing force of the shield member 230 coupled between the first fixing portion 213 and the second fixing portion 215 by being coupled to the second area 231*b* of the shield member 230. In an embodiment, by extending to have a predetermined length in the first direction, the second member 250 may include a recess 253*b* provided in a direction away from the central axis direction of the second member 250. The second member 250 may allow some of the foreign substances directed to the shield member 230 through, for example, the second inner space 251 to accumulate in the recess 253*b*.

Figure 3:
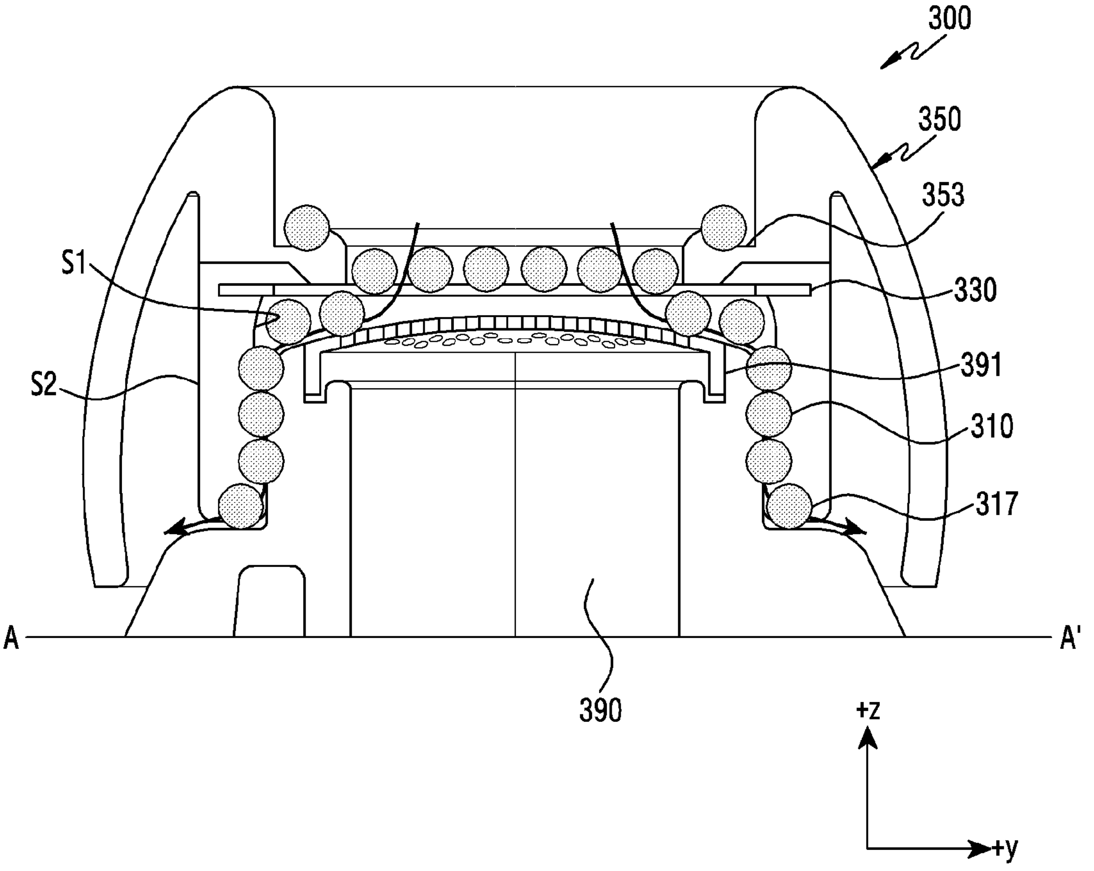
FIG. 3 is a cross-sectional view of an example ear tip according to various embodiments.

FIG. 3 is a cross-sectional view of an example ear tip according to various embodiments of the disclosure.

Referring to FIG. 3, an ear tip 300 (e.g., the ear tip 200 of FIG. 2A) according to various embodiments may include an outlet 317 to discharge some foreign substances that have passed through the shield member 330 to the outside of the first member 310 from among the foreign substances introduced through the second inner space (e.g., the second inner space 251 of FIG. 2A) of the second member 350.

According to various embodiments, the outlet 317 may be provided in a portion of the inner surface S1 of the first member 310. For example, the outlet 317 may be a recess (or a gap) in the first surface S1 of the first member 310, wherein the outlet 317 is not in contact with the sound output device 390 when the sound output device 390 is disposed in the first inner space (e.g., the first inner space 211 of FIG. 2A) of the first member 310. In various embodiments, the outlet 317 may be opened to the outer surface S2 of the first member 310 without being in contact with the sound output device 390. The outlet 317 may discharge some foreign substances that have passed the shield member 330 from among the foreign substances introduced through the second inner space 251 of the second member 350 to the outside 310 through a recess (or a gap) opened to the outer surface S2 of the first member 310.

According to various embodiments, the outlet 317 may penetrate the first member 310 from the inner surface S1 to the outer surface S2. For example, the outlet 317 may be a passage penetrating the first member 310 from the inner surface S1 to the outer surface S2. In various embodiments, the outlet 317 may discharge some foreign substances that have passed through the shield member 330 from among the foreign substances introduced through the second inner space 251 of the second member 350 from the inner surface S1 of the first member S1 to the outside of the first member 310.

In various embodiments, the outlet 317 may include a structure of one of a recess (or a gap) provided in the inner surface S1 of the first member 310 and a passage penetrating the first member 310 from the inner surface S1 to the outer surface S2.

According to various embodiments, the amount of foreign substances accumulated on a cover 391 disposed on the front surface (e.g., the surface in the +z-axis direction) of the sound output device 390 may be minimized by the function of the above-described outlet 317.

According to various embodiments, some of the foreign substances introduced through the second inner space 251 of the second member 350 may be blocked by the extension 353 of the second member 350 so as not to be directed to the shield member 330.

Figure 4:
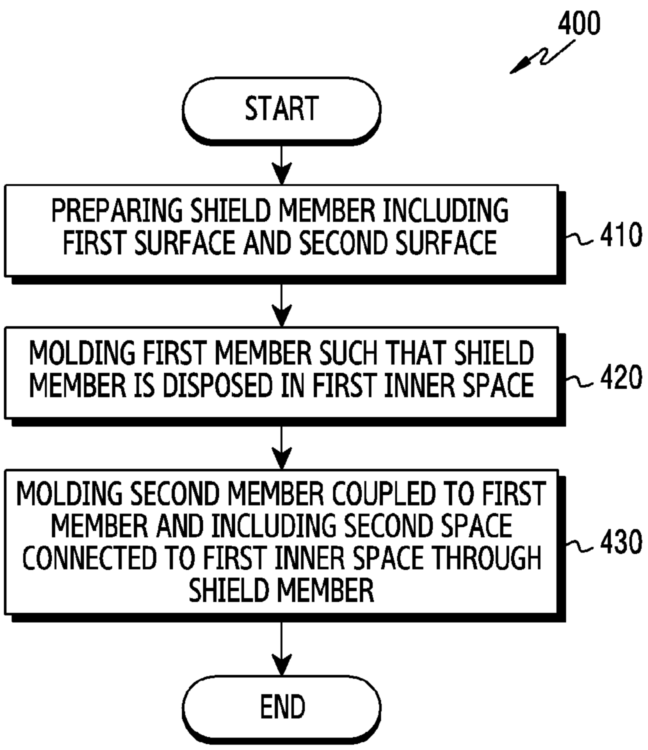
FIG. 4 is a flowchart illustrating an example ear tip manufacturing method according to various embodiments.

FIG. 4 is a flowchart illustrating an example ear tip manufacturing method according to various embodiments.

Referring to FIG. 4, a method 400 of manufacturing of an ear tip according to an embodiment may include a first process 410, a second process 420, and a third process 430 in order to reinforce the fixing force of the shield member (e.g., the shield member 230 of FIG. 2A) on a structure of an ear tip (e.g., the ear tip 200 in FIG. 2A). At least some of the elements in the first process 410, the second process 420, and the third process 430 may correspond to the elements described with reference to FIGS. 2A and 2B, and may include the same reference numerals as the corresponding elements.

Referring to the first process 410, the shield member 230 may be prepared to be coupled with the first member 210. For example, the shield member 230 may be disposed in a molding mold (e.g., a first molding mold) for molding the first member 210. The position where the shield member 230 is disposed in the molding frame for molding the first member 210 may correspond to the position where the first fixing portion 213 and the second fixing portion 215 are to be molded in the first inner space 211 of the first member

210. The shield member 230 may include a first surface 231 facing a first direction and a second surface 233 facing a second direction. At least a portion of each of the first surface 231 and the second surface 233 may be coupled to the first fixing portion 213 and the second fixing portion 215 in the first member 210 molding process (e.g., the second process 420).

Referring to the second process 420, the first member 210 may be molded to form substantially the same body as the shield member 230. For example, the first fixing portion 213 of the first member 210 may be molded to be coupled to a portion (e.g., an edge) of the first surface 231 of the shield member 230 in the molding mold in which the shield member 230 is disposed, and the second fixing portion 215 may be molded to be coupled to a portion (e.g., an edge) of the second surface 233 of the shield member 230. In this case, the shield member 230 may be disposed within the first inner space 211 of the first member 210. A first portion 103*a* of a sound output device (e.g., the electronic device 101 of FIG. 1) may be inserted into the first inner space 211 of the first member 210. The second fixing portion 215 may be molded to include the first opening 213*a* connected to the first inner space 211. The first opening 213*a* may have a first diameter (e.g., the first diameter D1 of FIG. 2A) of a predetermined length (e.g., 3 mm).

Referring to the third process 430, the second member 250 may include a second inner space 251 that is opened to the first and second directions and may be molded to be coupled with the first member 210. The second inner space 251 of the second member 250 may be connected to the first inner space 211 of the first member 210 through the shield member 230. In an embodiment, the second member 250 may be molded to surround at least a portion of the first member 210. In an embodiment, an extension 253 may be molded in the second inner space 251 of the second member 250. The second member 250 may form substantially the same body with the first member 210 by being coupled with the first fixing portion 213 of the first member 210 via the extension 253. In an embodiment, the extension 253 may be molded to include a second opening 253*a* connected to the second inner space 251. The second opening 253*a* may have a second diameter (e.g., the second diameter D2 of FIG. 2A) of a predetermined length (e.g., 2 mm). The second diameter D2 of the second opening 253*a* may be smaller than the first diameter D1 of the first opening 213*a*.

Figure 5:
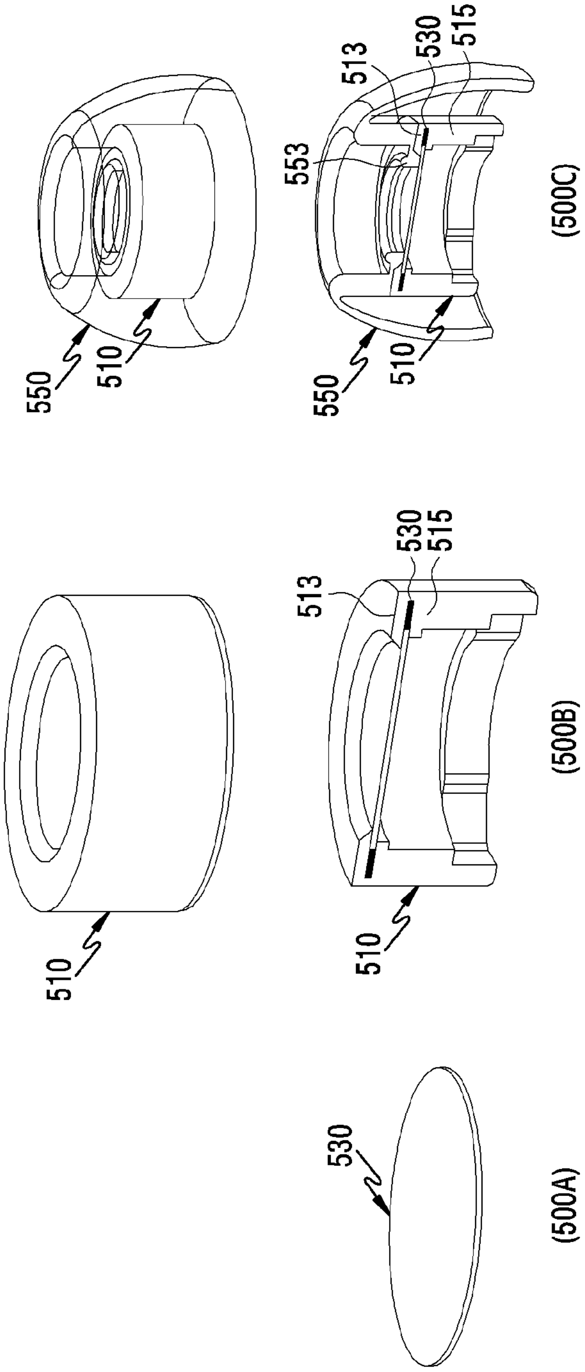
FIG. 5 is a view of example processes related to an ear tip manufacturing method according to various embodiments.

FIG. 5 is a view of example processes related to an ear tip manufacturing method according to various embodiments.

Referring to FIG. 5, processes related to the ear tip manufacturing method according to various embodiments (e.g., the manufacturing method 400 of FIG. 4) are illustrated. In various embodiments, processes related to the ear tip manufacturing method 400 may include a first process 500A, a second process 500B, and a third process 500C. In various embodiments, the first process 500A, the second process 500B, and the third process 500C may be sequentially executed.

Referring to the first process 500A, a shield member 530 (e.g., the shield member 230 of FIG. 2A) may be disposed in a molding mold (e.g., a first mold) for an ear tip (e.g., the ear tip 200 of FIG. 2A). For example, the shield member 530 may be disposed in a molding mold related to molding of the first member 510 before molding of the first member 510 (e.g., the first member 210 of FIG. 2A) is completed. In various embodiments, the shield member 530 may be in the form of a mesh including multiple openings to allow sound waves of audio data output through the audio output device to pass through. In various embodiments, the shield member 530 may have a predetermined hardness (e.g., hardness 65). In various embodiments, the shield member 530 may be made of a metal or non-metal material.

Referring to the second process 500B, a first member 510 may be molded to be coupled with the shield member 530 in the molding mold in which the shield member 530 is disposed. For example, in the second process 500B, a first fixing portion 513 (e.g., the first fixing portion 213 in FIG. 2B) of the first member 510 may be coupled to a first surface (e.g., the first surface 231 of FIG. 2A) of the shield member 530, and a second fixing portion 515 (e.g., the second fixing portion 215 in FIG. 2A) may be molded to be coupled to a second surface (e.g., the second surface 233 in FIG. 2B) of the shield member 530. In this case, the shield member 530 may be disposed in a first inner space (e.g., the first inner space 211 of FIG. 2A) of the first member 510 by being coupled between the first fixing portion 513 and the second fixing portion 515. In various embodiments, the first member 510 may be molded to have a predetermined hardness (e.g., hardness 65). The first member 510 may have the same hardness as the shield member 530. In various embodiments, the first member 510 may be made of silicone or urethane.

Referring to the third process 500C, a second member 550 (e.g., the second member 250 of FIG. 2A) may be molded in a molding mold (e.g., a second molding mold) in which the first member 510 molded through the second process 500B is disposed. For example, in the third process 500C, an extension 553 (e.g., the extension 253 of FIG. 2A) may be molded to be coupled to the first fixing portion 513 of the first member 510 and the first surface 231 of the shield member 530. In this case, the extension 553 may prevent (or reduce) the shield member 530 from being deformed in the process of molding the second member 550 by reinforcing the fixing force of the first surface 231 by the extension 553. In various embodiments, the second member 550 may be molded to have a predetermined hardness (e.g., hardness 20). The predetermined hardness of the second member 550 may be lower than that of the first member 510 in order to provide a user with a soft fit. In various embodiments, the second member 550 may be made of silicone or urethane.

According to various example embodiments, an electronic device (e.g., the electronic device 101 in FIG. 1A) may include a housing (e.g., the housing 103 in FIG. 1A), a speaker (e.g., the speaker 105 in FIG. 1A) disposed within the housing 103, and an ear tip (e.g., the ear tip 100 in FIGS. 1A and 1B) coupled to the housing 103. The ear tip 100 may include a first member (e.g., the first member 210 in FIGS. 2A and 2B) including a first inner space (e.g., the first inner space 211 in FIG. 2A) that is opened to a first direction and a second direction opposite to the first direction, a shield member (e.g., the shield member 230 in FIGS. 2A and 2B) including a first surface (e.g., the first surface 231 in FIG. 2B) facing the first direction and a second surface (e.g., the second surface 233 in FIG. 2B) facing the second direction, wherein the shielding member is disposed in the first inner space 211, and a second member (e.g., second member 250) including a second inner space (e.g., the second inner space 251 in FIG. 2A) connected to the first inner space 211 through the shielding member 230, wherein the second member 250 is coupled to the first member 210 to surround at least a portion of the first member 210. The first member 210 may include a first fixing portion (e.g., the first fixing portion 213 of FIGS. 2A and 2B) coupled to a first area (e.g., the first area 231*a* of FIG. 2B) of the first surface 231, and a second fixing portion (e.g., the second fixing portion 215 in FIGS. 2A and 2B) coupled to an area (e.g., the overlapping area 233*a* in FIG. 2B) of the second surface 233 that partially overlaps the first area 231*a* when viewed from the first direction.

According to various example embodiments, the first fixing portion 213 may be coupled to the second member 250 via an inclined surface (e.g., the inclined surface 213*b* in FIG. 2B).

According to various example embodiments, the second member 250 may include an extension (e.g., the extension 253 of FIGS. 2A and 2B) coupled to a second area (e.g., the second area 231*b* in FIG. 2B) adjacent to the first area 231*a* of the first surface 231.

According to various example embodiments, the second fixing portion 215 may include a first opening (e.g., the first opening 213*a* in FIG. 2A) connected to the first inner space 211, the extension 253 may include a second opening (e.g., the second opening 253*a* in FIG. 2A) connected to the second inner space 251, and a first diameter (e.g., the first diameter D1 in FIG. 2A) of the first opening 213*a* may be greater than a second diameter (e.g., the second diameter D2 in FIG. 2*a*) of the second opening 253*a*.

According to various example embodiments, the extension 253 may extend to have a predetermined length in the first direction and may include a recess 253*b* (e.g., the recess 253*b* in FIG. 2B) provided in a direction away from the central axis direction of the second member 250.

According to various example embodiments, the first member 210 may include an outlet (e.g., the outlet 317 in FIG. 3) provided in a portion of the inner surface (e.g., the inner portion S1 in FIG. 3) thereof, wherein the outlet 317 is opened to the outer surface (e.g., the outer surface S2) of the first member 210 without being in contact with a first portion 103*a* of the housing when the first portion 103*a* is disposed in the first inner space 211.

According to various example embodiments, the first member 210 may include an outlet 317 penetrating the first member 210 from the inner surface S1 to the outer surface S2 of the first member 210.

According to various example embodiments, an ear tip 100 may include a first member 210 including a first inner space 211 that is opened to a first direction and a second direction opposite to the first direction, a shield member 230 including a first surface 231 that faces the first direction and a second surface 233 that faces the second direction, wherein the shield member 230 is disposed in the first inner space 211, and a second member 250 including a second inner space 251 connected to the first inner space 211 through the shield member 230, wherein the second member 250 is coupled to the first member 210 to surround at least a portion of the first member 210. The first member 210 may include a first fixing portion 213 coupled to a first area 231*a* of the first surface 231, and a second fixing portion 215 coupled to an area 233*a* of the second surface 233 that partially overlaps the first area 231*a* when viewed from the first direction.

According to various example embodiments, the first fixing portion 213 may be coupled to the second member 250 via an inclined surface 213*b*.

According to various example embodiments, the second member 250 may include an extension 253 coupled to a second area 231*b* adjacent to the first area 231*a* of the first surface 231.

According to various example embodiments, the second fixing portion 215 may include a first opening 213*a* connected to the first inner space 211, the extension 253 may include a second opening 253*a* connected to the second inner space 251, and a first diameter D1 of the first opening 213*a* may be greater than a second diameter D2 of the second opening 253*a*.

According to various example embodiments, the extension 253 may extend to have a predetermined length in the first direction and may include a recess 253*b* provided in a direction away from the central axis direction of the second member 250.

According to various example embodiments, the first member 210 may include an outlet 317 provided in a portion of an inner surface S1 thereof, wherein the outlet 317 is opened to the outer surface S2 of the first member 210 without being in contact with a first portion 103*a* of an electronic device coupled with the ear tip, when the first portion 103*a* is disposed in the first inner space 211.

According to various example embodiments, the first member 210 may include an outlet 317 penetrating the first member 210 from the inner surface S1 to the outer surface S2 of the first member 210.

According to various example embodiments, a method 400 of manufacturing an ear tip 100 may include a process of preparing a shielding member 230 including a first surface 231 facing a first direction and a second surface 233 facing a second direction opposite the first direction (e.g., the process 410 in FIG. 4), a process of molding a first member 210 such that the first member 210 includes a first inner space 211 that is opened to the first direction and the second direction and the shield member 230 is disposed in the first inner space 211 (e.g., the process 420 in FIG. 4), and a process of molding a second member 250 that includes a second inner space 251 connected to the first inner space 210 through the shield member 230 and is coupled to the first member 210 to surround at least a portion of the first member 210 (e.g., the process 430 in FIG. 4). The first member 210 may include a first fixing portion 213 coupled to a first area 231*a* of the first surface 231, and a second fixing portion 215 coupled to an area 233*a* of the second surface 233 that partially overlaps the first area 231*a* when viewed from the first direction.

According to various example embodiments, the first fixing portion 213 may be coupled to the second member 250 via an inclined surface 213*b*.

According to various example embodiments, the second member 250 may include an extension 253 coupled to a second area 231*b* adjacent to the first area 231*a* of the first surface 231.

According to various example embodiments, the second fixing portion 215 may include a first opening 213*a* connected to the first inner space 211, the extension 253 may include a second opening 253*a* connected to the second inner space 251, and a first diameter D1 of the first opening 213*a* may be greater than a second diameter D2 of the second opening 253*a*.

According to various example embodiments, the first member 210 may include an outlet 317 provided in a portion of an inner surface S1 thereof, wherein the outlet 317 is opened to the outer surface S2 of the first member 210 without being in contact with a first portion 103*a* of an electronic device coupled with the ear tip, when the first portion 103*a* is disposed in the first inner space 211.

According to various example embodiments, the first member 210 may include an outlet 317 penetrating the first member 210 from the inner surface S1 to the outer surface S2 of the first member 210.

Figure 6:
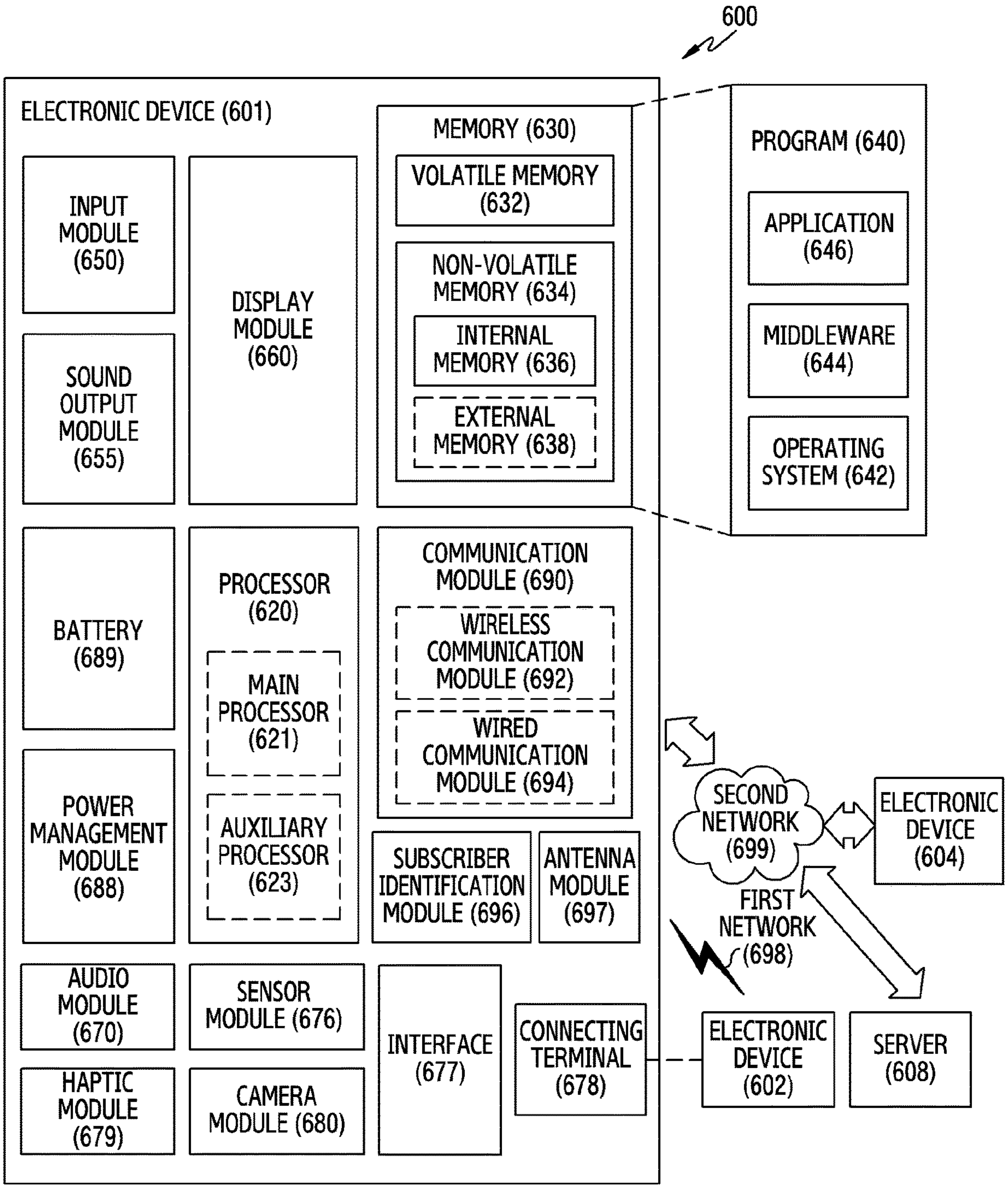
FIG. 6 is a view illustrating an example electronic device within a network environment according to various embodiments.

FIG. 6 is a view illustrating an example electronic device within a network environment according to various embodiments.

Referring to FIG. 6, the electronic device 601 in the network environment 600 may communicate with an electronic device 602 via a first network 698 (e.g., a short-range wireless communication network), or at least one of an electronic device 604 or a server 608 via a second network 699 (e.g., a long-range wireless communication network). According to an embodiment, the electronic device 601 may communicate with the electronic device 604 via the server 608. According to an embodiment, the electronic device 601 may include a processor 620, memory 630, an input module 650, a sound output module 655, a display module 660, an audio module 670, a sensor module 676, an interface 677, a connecting terminal 678, a haptic module 679, a camera module 680, a power management module 688, a battery 689, a communication module 690, a subscriber identification module (SIM) 696, or an antenna module 697. In various embodiments, at least one of the components (e.g., the connecting terminal 678) may be omitted from the electronic device 601, or one or more other components may be added in the electronic device 601. In various embodiments, some of the components (e.g., the sensor module 676, the camera module 680, or the antenna module 697) may be implemented as a single component (e.g., the display module 660).

The processor 620 may execute, for example, software (e.g., a program 640) to control at least one other component (e.g., a hardware or software component) of the electronic device 601 coupled with the processor 620, and may perform various data processing or computation. According to an embodiment, as at least part of the data processing or computation, the processor 620 may store a command or data received from another component (e.g., the sensor module 676 or the communication module 690) in volatile memory 632, process the command or the data stored in the volatile memory 632, and store resulting data in non-volatile memory 634. According to an embodiment, the processor 620 may include a main processor 621 (e.g., a central processing unit (CPU) or an application processor (AP)), or an auxiliary processor 623 (e.g., a graphics processing unit (GPU), a neural processing unit (NPU), an image signal processor (ISP), a sensor hub processor, or a communication processor (CP)) that is operable independently from, or in conjunction with, the main processor 621. For example, when the electronic device 601 includes the main processor 621 and the auxiliary processor 623, the auxiliary processor 623 may be adapted to consume less power than the main processor 621, or to be specific to a specified function. The auxiliary processor 623 may be implemented as separate from, or as part of, the main processor 621.

The auxiliary processor 623 may control at least some of functions or states related to at least one component (e.g., the display module 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to an embodiment, the auxiliary processor 623 (e.g., an image signal processor or a communication processor) may be implemented as part of another component (e.g., the camera module 680 or the communication module 690) functionally related to the auxiliary processor 623. According to an embodiment, the auxiliary processor 623 (e.g., the neural processing unit) may include a hardware structure specified for artificial intelligence model processing. An artificial intelligence model may be generated by machine learning. Such learning may be performed, e.g., by the electronic device 601 where the artificial intelligence is performed or via a separate server (e.g., the server 608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input module 650 may receive a command or data to be used by another component (e.g., the processor 620) of the electronic device 601, from the outside (e.g., a user) of the electronic device 601. The input module 650 may include, for example, a microphone, a mouse, a keyboard, a key (e.g., a button), or a digital pen (e.g., a stylus pen).

The sound output module 655 may output sound signals to the outside of the electronic device 601. The sound output module 655 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 660 may visually provide information to the outside (e.g., a user) of the electronic device 601. The display module 660 may include, for example, a display, a hologram device, or a projector and control circuitry to control a corresponding one of the display, hologram device, and projector. According to an embodiment, the display module 660 may include a touch sensor adapted to detect a touch, or a pressure sensor adapted to measure the intensity of force incurred by the touch.

The audio module 670 may convert a sound into an electrical signal and vice versa. According to an embodiment, the audio module 670 may obtain the sound via the input module 650, or output the sound via the sound output module 655 or a headphone of an external electronic device (e.g., an electronic device 602) directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. According to an embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device (e.g., the electronic device 602) directly (e.g., wiredly) or wirelessly. According to an embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device (e.g., the electronic device 602). According to an embodiment, the connecting terminal 678 may include, for example, a HDMI connector, a USB connector, a SD card connector, or an audio connector (e.g., a headphone connector).

The haptic module 679 may convert an electrical signal into a mechanical stimulus (e.g., a vibration or a movement) or electrical stimulus which may be recognized by a user via his/her tactile sensation or kinesthetic sensation. According to an embodiment, the haptic module 679 may include, for example, a motor, a piezoelectric element, or an electric stimulator.

The camera module 680 may capture a still image or moving images. According to an embodiment, the camera module 680 may include one or more lenses, image sensors, image signal processors, or flashes.

The power management module 688 may manage power supplied to the electronic device 601. According to an embodiment, the power management module 688 may be implemented as at least part of, for example, a power management integrated circuit (PMIC).

The battery 689 may supply power to at least one component of the electronic device 601. According to an embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the application processor (AP)) and supports a direct (e.g., wired) communication or a wireless communication. According to an embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™ wireless-fidelity (Wi-Fi) direct, or infrared data association (IrDA)) or the second network 699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The wireless communication module 692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 692 may support a high-frequency band (e.g., the mmWave band) to achieve, e.g., a high data transmission rate. The wireless communication module 692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 692 may support various requirements specified in the electronic device 601, an external electronic device (e.g., the electronic device 604), or a network system (e.g., the second network 699). According to an embodiment, the wireless communication module 692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 697 may transmit or receive a signal or power to or from the outside (e.g., the external electronic device) of the electronic device 601. According to an embodiment, the antenna module 697 may include an antenna including a radiating element composed of or including a conductive material or a conductive pattern formed in or on a substrate (e.g., a printed circuit board (PCB)). According to an embodiment, the antenna module 697 may include a plurality of antennas (e.g., array antennas). In such a case, at least one antenna appropriate for a communication scheme used in the communication network, such as the first network 698 or the second network 699, may be selected, for example, by the communication module 690 (e.g., the wireless communication module 692) from the plurality of antennas. The signal or the power may then be transmitted or received between the communication module 690 and the external electronic device via the selected at least one antenna. According to an embodiment, another component (e.g., a radio frequency integrated circuit (RFIC)) other than the radiating element may be additionally formed as part of the antenna module 697.

According to various embodiments, the antenna module 697 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 601 and the external electronic device 604 via the server 608 coupled with the second network 699. Each of the electronic devices 602 or 604 may be a device of a same type as, or a different type, from the electronic device 601. According to an embodiment, all or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, mobile edge computing (MEC), or client-server computing technology may be used, for example. The electronic device 601 may provide ultra low-latency services using, e.g., distributed computing or mobile edge computing. In an embodiment, the external electronic device 604 may include an internet-of-things (IoT) device. The server 608 may be an intelligent server using machine learning and/or a neural network. According to an embodiment, the external electronic device 604 or the server 608 may be included in the second network 699. The electronic device 601 may be applied to intelligent services (e.g., smart home, smart city, smart car, or healthcare) based on 5G communication technology or IoT-related technology.

Figure 7:
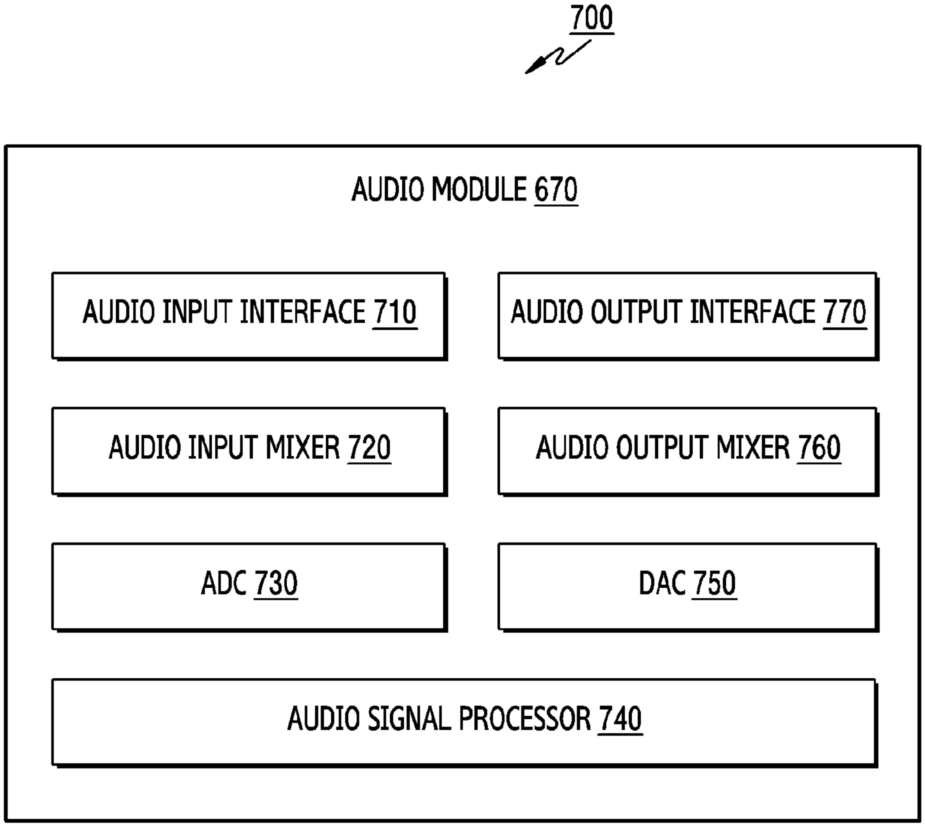
FIG. 7 is a block diagram illustrating an example audio module according to various embodiments.

FIG. 7 is a block diagram 700 illustrating an example audio module according to various embodiments.

Referring to FIG. 7, the audio module 670 may include, for example, an audio input interface 710, an audio input mixer 720, an analog-to-digital converter (ADC) 730, an audio signal processor 740, a digital-to-analog converter (DAC) 750, an audio output mixer 760, or an audio output interface 770.

The audio input interface 710 (including, e.g., audio input interface circuitry) may receive an audio signal corresponding to a sound obtained from the outside of the electronic device 601 via a microphone (e.g., a dynamic microphone, a condenser microphone, or a piezo microphone) that is configured as part of the input device 650 or separately from the electronic device 601. For example, if an audio signal is obtained from the external electronic device 602 (e.g., a headset or a microphone), the audio input interface 710 may be connected with the external electronic device 602 directly via the connecting terminal 678, or wirelessly (e.g., Bluetooth™ communication) via the wireless communication module 692 to receive the audio signal. According to an embodiment, the audio input interface 710 may receive a control signal (e.g., a volume adjustment signal received via an input button) related to the audio signal obtained from the external electronic device 602. The audio input interface 710 may include a plurality of audio input channels and may receive a different audio signal via a corresponding one of the plurality of audio input channels, respectively. According to an embodiment, additionally or alternatively, the audio input interface 710 may receive an audio signal from another component (e.g., the processor 620 or the memory 630) of the electronic device 601.

The audio input mixer 720 may synthesize a plurality of inputted audio signals into at least one audio signal. For example, according to an embodiment, the audio input mixer 720 may synthesize a plurality of analog audio signals inputted via the audio input interface 710 into at least one analog audio signal.

The ADC 730 may convert an analog audio signal into a digital audio signal. For example, according to an embodiment, the ADC 730 may convert an analog audio signal received via the audio input interface 710 or, additionally or alternatively, an analog audio signal synthesized via the audio input mixer 720 into a digital audio signal.

The audio signal processor 740 (including, e.g., audio signal processing circuitry) may perform various processing on a digital audio signal received via the ADC 730 or a digital audio signal received from another component of the electronic device 601. For example, according to an embodiment, the audio signal processor 740 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 740 may be implemented in the form of an equalizer.

The DAC 750 may convert a digital audio signal into an analog audio signal. For example, according to an embodiment, the DAC 750 may convert a digital audio signal processed by the audio signal processor 740 or a digital audio signal obtained from another component (e.g., the processor (620) or the memory (630)) of the electronic device 601 into an analog audio signal.

The audio output mixer 760 may synthesize a plurality of audio signals, which are to be outputted, into at least one audio signal. For example, according to an embodiment, the audio output mixer 760 may synthesize an analog audio signal converted by the DAC 750 and another analog audio signal (e.g., an analog audio signal received via the audio input interface 710) into at least one analog audio signal.

The audio output interface 770 (including, e.g., audio output interface circuitry) may output an analog audio signal converted by the DAC 750 or, additionally or alternatively, an analog audio signal synthesized by the audio output mixer 760 to the outside of the electronic device 601 via the sound output device 655. The sound output device 655 may include, for example, a speaker, such as a dynamic driver or a balanced armature driver, or a receiver. According to an embodiment, the sound output device 655 may include a plurality of speakers. In such a case, the audio output interface 770 may output audio signals having a plurality of different channels (e.g., stereo channels or 5.1 channels) via at least some of the plurality of speakers. According to an embodiment, the audio output interface 770 may be connected with the external electronic device 602 (e.g., an external speaker or a headset) directly via the connecting terminal 678 or wirelessly via the wireless communication module 692 to output an audio signal.

According to an embodiment, the audio module 670 may generate, without separately including the audio input mixer 720 or the audio output mixer 760, at least one digital audio signal by synthesizing a plurality of digital audio signals using at least one function of the audio signal processor 740.

According to an embodiment, the audio module 670 may include an audio amplifier (not shown) (e.g., a speaker amplifying circuit) that is capable of amplifying an analog audio signal inputted via the audio input interface 710 or an audio signal that is to be outputted via the audio output interface 770. According to an embodiment, the audio amplifier may be configured as a module separate from the audio module 670.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 640) including one or more instructions that are stored in a storage medium (e.g., internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers to a storage medium that is a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:

a housing;

a speaker disposed within the housing; and an ear tip coupled to the housing, wherein the ear tip comprises:

- a first member comprising a first inner space that is opened to a first direction and a second direction opposite to the first direction;
- a shield member comprising a first surface that faces the first direction and a second surface that faces the second direction, wherein the shield member is disposed in the first inner space; and a second member comprising a second inner space connected to the first inner space through the shield member, wherein the second member is coupled to the first member to surround at least a portion of the first member, and wherein the first member comprises:

a first fixing portion coupled to a first area of the first surface; and a second fixing portion coupled to an area of the second surface that partially overlaps the first area when viewed from the first direction.

2. The electronic device of claim 1, wherein the first fixing portion is coupled to the second member via an inclined surface.

3. The electronic device of claim 1, wherein the second member comprises an extension coupled to a second area of the first surface adjacent to the first area.

4. The electronic device of claim 3, wherein the second fixing portion comprises a first opening connected to the first inner space, the extension comprises a second opening connected to the second inner space, and a first diameter of the first opening is greater than a second diameter of the second opening.

5. The electronic device of claim 3, wherein the extension has a predetermined length in the first direction and comprises a recess provided in a direction away from a central axis direction of the second member.

6. The electronic device of claim 1, wherein the first member comprises an outlet provided in a portion of an inner surface thereof, wherein the outlet is opened to an outer surface of the first member without being in contact with a first portion of the housing when the first portion is disposed in the first inner space.

7. The electronic device of claim 1, wherein the first member comprises an outlet penetrating the first member from an inner surface to an outer surface of the first member.

8. An ear tip comprising:

a first member comprising a first inner space that is opened to a first direction and a second direction opposite to the first direction;

a shield member comprising a first surface that faces the first direction and a second surface that faces the second direction, wherein the shield member is disposed in the first inner space; and a second member comprising a second inner space connected to the first inner space through the shield member, wherein the second member is coupled to the first member to surround at least a portion of the first member, wherein the first member comprises:

a first fixing portion coupled to a first area of the first surface; and a second fixing portion coupled to an area of the second surface that partially overlaps the first area when viewed from the first direction.

9. The ear tip of claim 8, wherein the first fixing portion is coupled to the second member via an inclined surface.

10. The ear tip of claim 8, wherein the second member comprises an extension coupled to a second area of the first surface adjacent to the first area.

11. The ear tip of claim 10, wherein the second fixing portion comprises a first opening connected to the first inner space, the extension comprises a second opening connected to the second inner space, and a first diameter of the first opening is greater than a second diameter of the second opening.

12. The ear tip of claim 10, wherein the extension has a predetermined length in the first direction and comprises a recess provided in a direction away from a central axis direction of the second member.

13. The ear tip of claim 8, wherein the first member comprises an outlet provided in a portion of an inner surface thereof, wherein the outlet is opened to an outer surface of the first member without being in contact with a first portion of an electronic device coupled with the ear tip, when the first portion is disposed in the first inner space.

14. The ear tip of claim 8, wherein the first member comprises an outlet penetrating the first member from an inner surface to an outer surface of the first member.

15. A method of manufacturing an ear tip comprising:

preparing a shielding member comprising a first surface facing a first direction and a second surface facing a second direction opposite the first direction;

molding a first member such that the first member comprises a first inner space that is opened to the first direction and the second direction and the shield member is disposed in the first inner space; and molding a second member that comprises a second inner space connected to the first inner space through the shield member and is coupled to the first member to surround at least a portion of the first member, wherein the first member comprises:

a first fixing portion coupled to a first area of the first surface; and a second fixing portion coupled to an area of the second surface that partially overlaps the first area when viewed from the first direction.

16. The method of claim 15, wherein the first fixing portion is coupled to the second member via an inclined surface.

17. The method of claim 15, wherein the second member comprises an extension coupled to a second area of the first surface adjacent to the first area.

18. The method of claim 17, wherein the second fixing portion comprises a first opening connected to the first inner space, the extension comprises a second opening connected to the second inner space, and a first diameter of the first opening is greater than a second diameter of the second opening.

19. The method of claim 15, wherein the first member comprises an outlet provided in a portion of an inner surface thereof, wherein the outlet is opened to an outer surface of the first member without being in contact with a first portion of an electronic device coupled with the ear tip, when the first portion is disposed in the first inner space.

20. The method of claim 15, wherein the first member comprises an outlet penetrating the first member from an inner surface to an outer surface of the first member.

* * * * *